United States Patent [19]

Schäfer

[11] 4,256,062
[45] Mar. 17, 1981

[54] INTERNAL COMBUSTION DIESEL ENGINE

[75] Inventor: Hans-Jürgen Schäfer, Brunswick, Fed. Rep. of Germany

[73] Assignee: Volkswagenwerk Aktiengesellschaft, Wolfsburg, Fed. Rep. of Germany

[21] Appl. No.: 3,999

[22] Filed: Jan. 17, 1979

[30] Foreign Application Priority Data

Jan. 27, 1978 [DE] Fed. Rep. of Germany ....... 2803533

[51] Int. Cl.³ .......................... F02B 3/06; F02B 31/00
[52] U.S. Cl. ............... 123/52 M; 123/188 M; 123/308
[58] Field of Search ............... 123/30 C, 52 M, 75 B, 123/188 M, 188 S, 122 AB, 306, 308

[56] References Cited

U.S. PATENT DOCUMENTS

| 3,678,905 | 7/1972 | Diehl | 123/188 M |
| 3,868,940 | 3/1975 | Kirchweger | 123/188 M |
| 3,884,209 | 5/1975 | List et al. | 123/188 M |
| 4,015,577 | 4/1977 | Elsbett et al. | 123/188 M |
| 4,151,820 | 5/1979 | Furacz | 123/122 AB |

FOREIGN PATENT DOCUMENTS

| 1249174 | 11/1960 | France | 123/30 C |
| 1254315 | 11/1971 | United Kingdom | 123/26 |

Primary Examiner—Craig R. Feinberg
Attorney, Agent, or Firm—Brumbaugh, Graves, Donohue & Raymond

[57] ABSTRACT

An internal combustion diesel engine has a fuel injection means for injecting fuel directly into one or more combustion chambers. Each combustion chamber has a first air-intake duct for supplying air to the combustion chamber, which first duct is designed as a swirl duct. A second air-intake is associated with each combustion chamber and is connected in parallel with the first duct for supplying an increasing quantity of substantially swirl-free air to the combustion chamber in response to increasing engine speed.

6 Claims, 2 Drawing Figures

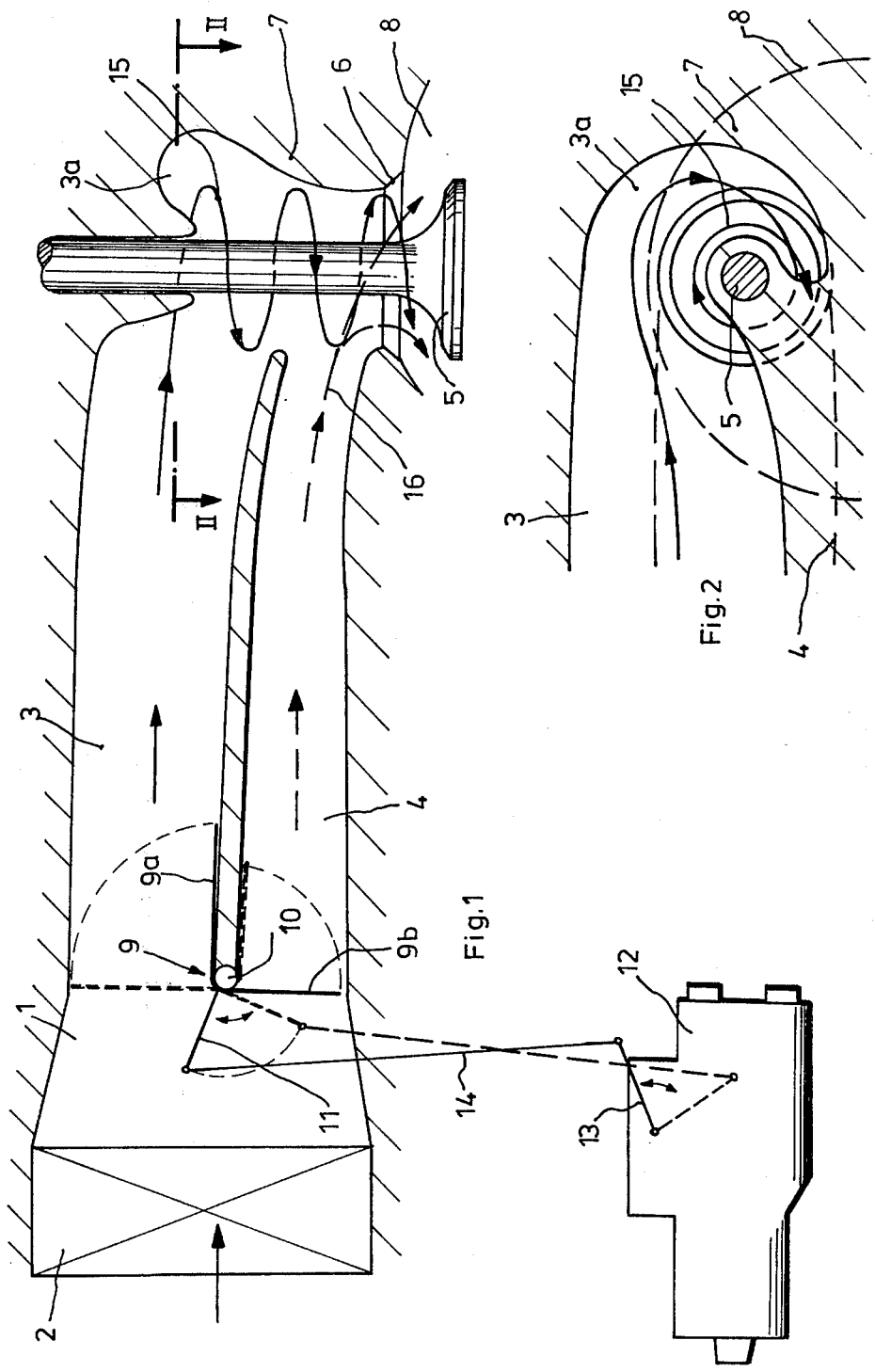

INTERNAL COMBUSTION DIESEL ENGINE

BACKGROUND OF THE INVENTION

This invention relates to an internal combustion diesel engine having a fuel injection system for injecting fuel directly into one or more combustion chambers, each chamber having an air-intake duct designed as a swirl duct.

In internal combustion diesel engines, since fuel is injected into the cylinder separate from the incoming air, a specific air flow configuration of the air in the combustion chamber is needed in order to form a proper mixture. This defined air flow path, in most engine designs, is obtained with an air-intake duct designed as a swirl duct. A swirl is then imparted to the incoming air which depends on the particular design of the duct and by the particular engine speed. Swirling of the intake air is particularly needed at low operating speeds of the engine, with a certain minimum amount of swirl required to assure a complete homogeneous mixture. The structural design of the swirl duct is usually adapted to provide at least this minimum amount of swirling at low engine speed.

As the engine speed increases, however, the swirl duct configuration represents a restriction in the intake flow, resulting in considerable losses in the delivery rate of air to the engine. This can severely limit the engine performance at higher speeds. At the same time, the increase in the swirl imparted by the swirl duct, resultant from a faster flow of incoming air, is not required to optimize the mixture preparation; that is, complete mixture of the fuel and air will occur anyway with a less swirl.

SUMMARY OF THE INVENTION

In accordance with the present invention, an internal combustion diesel engine has an intake air design configuration which at low engine speeds provides a sufficiently high air inlet swirl to result in an optimal preparation of the mixture, yet at higher engine speeds will not restrict the intake flow of air as would ordinarilly be caused by standard swirl duct designs.

More particularly, the invention is an internal combustion diesel engine having a fuel injection system for injecting fuel directly into one or more combustion chambers. Each combustion chamber has a first air-intake duct for supplying air to the chamber designed as a swirl duct, and a second air-intake connected in parallel with the first duct for supplying substantially swirl-free air to the combustion chamber. In accordance with the invention, the second duct supplies an increasing quantity of air to the combustion chambers in response to increasing engine speed. At higher engine speeds, therefore, a greater amount of the intake air supplied to the combustion chambers passes through the second air-intake duct, and the flow losses which would otherwise occur if all the incoming air had to pass through the swirl duct are thus avoided. As a result, sufficient air is provided to the engine in all operating states. At the same time, at low engine speeds the swirl duct provides the necessary degree of inlet swirl of the air taken in to obtain optimal preparation of the mixture.

the swirl duct and the second air-intake duct preferably communicate with a common intake valve of the combustion chamber, thus obviating the need for two separate inlet valves for the enginer cylinder.

A control device for directing the flow of air either through the swirl duct or the second inlet duct may also be provided and regulated in accordance with engine speed. Such control devices may be in the form of a throttle valve arranged in each intake duct. In another form, a single throttle valve is disposed in both ducts and arranged so that upon actuation it opens one duct and closes the other. Uniform control of the air flowing through the two air-intake ducts is thereby obtained in a simple manner. Moreover, since most diesel engines have injection pumps with an injection displacement lever whose position depends on the engine speed, the air flow control device may be connected with the injection displacement lever so that upon movement of the injection displacement lever the control valve in the intake line is actuated to change the relative flow of air through the swirl duct and the second duct.

It is equally possible to provide the requisite control of the flow through the two inlet ducts without the use of an inlet valve. This may be accomplished by designing the swirl duct so as to provide increasing flow resistance relative to the second duct with an increased flow of intake air. This will result in a reduced proportion of the incoming air flowing through the swirl duct to the combustion chamber as the engine speed increases, since the increased flow of intake air will tend to flow through the restriction-free passage of the second inlet duct.

BRIEF DESCRIPTION OF THE DRAWINGS

For a better understanding of the present invention, reference may be had to the following detailed description of a preferred embodiment, and to the accompanying drawings, in which:

FIG. 1 shows, in a partially schematic representation, a vertical section through the cylinder head of an internal combustion diesel engine having a first air-intake duct designed as a swirl duct, and a second substantially swirl-free air-intake duct; and FIG. 2 is a horizontal sectional view taken along lines II—II of FIG. 1 in the direction of the arrows.

DETAILED DESCRIPTION OF A PREFERRED EMBODIMENT

Referring to the drawings, an internal combustion diesel engine has an air-intake line 1 for supplying air to each of the engine cylinders, the combustion chamber 8 of one such cylinder being shown. Intake air enters the air-intake line 1 through a filter 2. The air intake line 1 is connected to the combustion chamber 8 by a first air-intake duct 3, designed as a swirl duct, and a second substantially swirl-free intake duct 4. The two intake ducts 3 and 4 communicate with a common cylinder inlet valve 5 so that air passing through the two ducts 3 and 4 may flow through the inlet opening 6 into the combustion chamber 8.

The swirl duct 3, which is disposed in the cylinder head 7 of the engine, has adjacent the inlet opening 6 a spiral shaped contour 3a in order to impart an inlet swirl to the air flowing through the swirl duct 3. The swirl imparted to the air corresponds approximately to the spiral line indicated at 15.

Air flow through the second air-intake duct 4, as opposed to the spiral flow pattern of the swirl duct air, flows directly in the combustion chamber 8 in the direction indicated by the broken arrow 16, and has substantially no swirl imparted to it.

Flow of the intake air from the intake line 1 is directed into the swirl duct 3 or second intake duct 4 by a control device 9 having two throttle valves, 9a and 9b, disposed in the swirl duct 3 and the second intake duct 4, respectively. The control device 9 has an actuating arm 11, which is connected by an actuating rod 14, or by a control cable, with the spray displacement lever 13 of the engine fuel injection system 12. Since the position of the spray displacement lever 13 depends on engine speed, the direct connection of the control device 9 with the lever 13 results in an engine speed-dependent control of the flow of air selectively through the two air intake ducts 3 and 4, so that at increasing engine speed the flow of air through the duct 3 is reduced as the flow of air through the second intake duct 4 is correspondingly increased. As shown in FIG. 1, at lower engine speeds the air control device 9 will be approximately in the position indicated by solid lines, in which the swirl duct 3 is fully opened by the throttle valve 9a, and the second air-intake duct 4 is substantially closed by the second throttle valve 9b. As the engine speed increases, the control valve 9 would be actuated counterclockwise about its center of rotation 10 so that either at a predetermined engine speed, or at top engine speed, the swirl duct 3 is closed off by the throttle valve 9a and the second air-intake duct 4 is fully opened by the throttle valve 9b. Alternatively, the arrangement may be designed so that even at top engine speed, some air is allowed to flow through the swirl duct 3, so that at all operating conditions at least a minimum swirl will be imparted to the incoming air.

The means for a speed dependent control of the air through the two parallel air intake ducts 3 and 4, may be other than a control valve arrangement 3. For example, the swirl duct 3 may be designed to provide increasing flow resistance relative to the second duct 4 with increased flow through of intake air, which will increase with increasing engine speed. Since the resistance to flow will be increasing in the swirl duct 3, the proportion of air flow through the swirl duct 3 will tend to decrease, and instead the air will flow through the restriction free passage of the second intake duct 4.

In any of the above-described embodiments, at lower engine speeds the swirl duct is fully effective to obtain an optimal preparation of the intake mixture. Thus, at least the minimum required swirl of the intake air is always provided at these operating conditions. On the other hand, as the engine speed increases, and the increase flow resistance of the swirl duct would tend to hinder the engine performance, the flow through of air would be increasingly diverted through the second intake duct 4 and provided to the engine in satisfactory quantities, without the imposition of a restriction in the flow.

Although the invention has been shown and described with reference to preferred embodiments thereof, it will be understood that variations and modifications of the device as shown will be apparent to those skilled in the art, while utilizing the inventive principals disclosed herein. All such modifications and variations are intended to be within the scope of the present invention, as defined in the following claims.

I claim:

1. In an internal combustion diesel engine having at least one cylinder having a combustion chamber, a fuel injection means for injecting fuel directly into the combustion chamber of each said cylinder, each said combustion chamber having a first air-only intake duct means for supplying air to said combustion chamber for combining and mixing with said fuel only in said combustion chamber, wherein said first duct means is designed as a swirl duct, the improvement comprising a second air-only intake duct means associated with each said combustion chamber and connected in parallel with said first duct means, for supplying an increasing quantity of substantially swirl-free air to said combustion chamber in response to increasing engine speed, said swirl-free air combining and mixing with said fuel also only in said combustion chamber.

2. A diesel engine according to claim 1, wherein each said chamber has an inlet valve, and said first and second duct means of each said chamber communicate with said inlet valve.

3. A diesel engine according to claim 1 or 2, wherein said swirl duct and said second duct means are designed to provide increasing flow resistance in said swirl duct relative to said second duct means with increased flow through of intake air, thereby to reduce the flow of air through said swirl duct to said combustion chamber relative to the flow through said second duct with increasing speed of said engine.

4. A diesel engine according to claim 1 or 2, further comprising control means in the form of a valve means for regulating the flow of intake air through said first duct and said second duct, and means for controlling said valve means in response to engine speed for reducing the flow of intake air through said first duct in response to increasing engine speed as the flow through said second duct is increased.

5. A diesel engine according to claim 4, wherein said valve means comprises a valve disposed in said first and second ducts, said valve arranged upon actuation to open one duct as it closes the other.

6. A diesel engine according to claim 5, wherein said fuel injection means comprises a fuel injection lever displaceable dependent upon engine speed, and said means for controlling said valve means comprises means for connecting said valve to said lever for actuating said valve in response to movement of said lever.

* * * * *